US006592038B2

(12) United States Patent
Goodwin, III

(10) Patent No.: US 6,592,038 B2
(45) Date of Patent: Jul. 15, 2003

(54) ITEM PROCESSING SYSTEM AND METHOD WHICH TRACK LABEL USAGE

(75) Inventor: John C. Goodwin, III, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/829,176

(22) Filed: Apr. 9, 2001

(65) Prior Publication Data

US 2002/0145047 A1 Oct. 10, 2002

(51) Int. Cl.[7] .................................................. G06K 7/10
(52) U.S. Cl. ......................... 235/462.46; 235/462.01; 235/375; 235/383; 235/385
(58) Field of Search ........................ 235/462.01, 472.02, 235/375, 383, 385

(56) References Cited

U.S. PATENT DOCUMENTS

| | | | |
|---|---|---|---|
| 4,816,824 A | 3/1989 | Katz et al. ............. 340/825.34 |
| 5,151,684 A | 9/1992 | Johnsen ....................... 340/572 |
| 5,239,167 A | 8/1993 | Kipp ........................... 235/383 |
| 5,666,530 A | 9/1997 | Clark et al. |
| 5,804,803 A | * 9/1998 | Cragun et al. ............... 235/375 |
| 5,837,983 A | * 11/1998 | Actis et al. .................. 235/437 |
| 5,838,253 A | * 11/1998 | Wurz et al. ............. 340/825.54 |
| 5,850,219 A | 12/1998 | Kumomura |
| 5,928,329 A | 7/1999 | Clark et al. |
| 5,962,834 A | * 10/1999 | Markman .................... 235/385 |
| 5,963,134 A | * 10/1999 | Bowers et al. ............ 340/572.1 |
| 6,019,394 A | 2/2000 | Chenoweth et al. .......... 283/81 |
| 6,125,369 A | 9/2000 | Wu et al. |
| 6,259,367 B1 | * 7/2001 | Klein ....................... 340/572.1 |
| 6,286,763 B1 | * 9/2001 | Reynolds et al. ....... 235/472.01 |
| 6,333,692 B1 | * 12/2001 | Andersen et al. ........ 340/572.1 |
| 6,354,493 B1 | * 3/2002 | Mon ........................... 235/380 |
| 6,398,105 B2 | * 6/2002 | Ramberg et al. ............ 235/375 |
| 6,429,776 B1 | * 8/2002 | Alicot et al. ............. 340/572.1 |
| 6,448,886 B2 | * 9/2002 | Garber et al. .............. 340/10.1 |
| 2001/0040693 A1 | 11/2001 | Saito et al. |
| 2001/0042093 A1 | 11/2001 | Shirai et al. |
| 2001/0054072 A1 | 12/2001 | Discolo et al. |

* cited by examiner

*Primary Examiner*—Thien M. Le
*Assistant Examiner*—Ahshik Kim
(74) *Attorney, Agent, or Firm*—Paul W. Martin

(57) ABSTRACT

An item processing system and method which track label usage for purposes including cost savings. The item processing system includes a barcode reader, a radio frequency label interrogator, and a computer which obtains first identification information from the barcode reader and second identification information from the radio frequency label interrogator, which associates receipt of the first identification information with an item if the item includes a barcode label, and which associates receipt of the second identification information with the item if the item includes a radio frequency label.

4 Claims, 2 Drawing Sheets

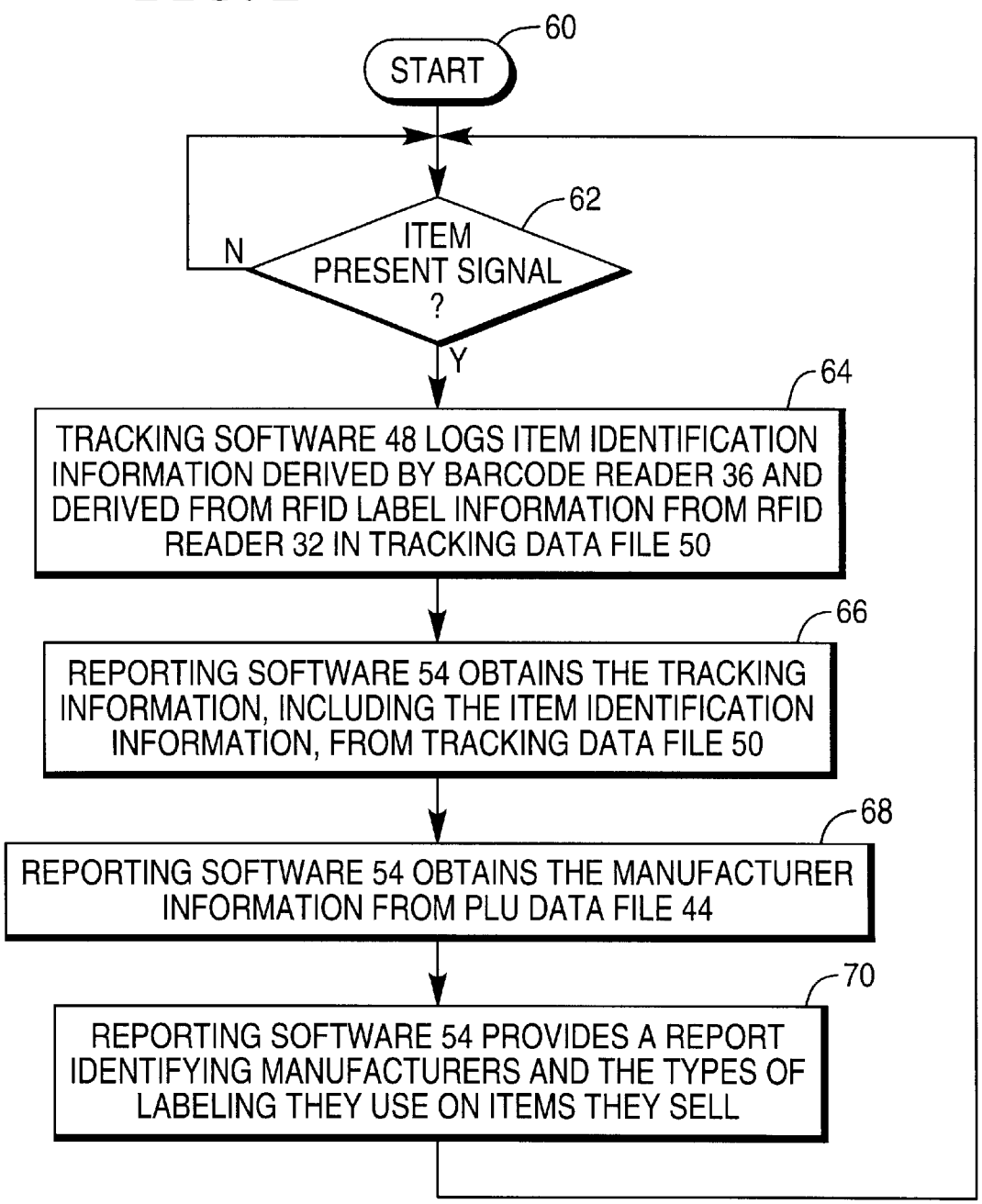

ITEM PROCESSING SYSTEM AND METHOD WHICH TRACK LABEL USAGE

BACKGROUND OF THE INVENTION

The present invention relates to checkout systems in supermarkets and other retail establishments, and more specifically to an item processing system and method which track label usage.

Checkout systems typically include barcode readers. Today, nearly all products are labelled with barcodes, either by the manufacturers or the retailers of such products.

Barcode readers come in various types for various purposes. The most common scanners are optical barcode readers which include lasers and mirrors for generating a scan pattern. Some are mounted in checkout counters, while others are portable and hand-held. An example barcode reader is disclosed in U.S. Pat. No. 5,229,588 assigned to the assignee of the present invention. This patent is hereby incorporated by reference.

Some items would not be identifiable and recordable by a barcode reader, if they were labelled with Radio Frequency Identification (RFID) labels rather than barcode labels. RFID technology provides an alternative to bar code reader technology for distinguishing and recording items for purchase. Some of the uses of RFID technology are disclosed in U.S. Pat. No. 6,019,394 assigned to the assignee of the present invention. This patent is hereby incorporated by reference.

It would be desirable to track items which don't have RFID labels in order to influence manufacturers to use RFID labels.

SUMMARY OF THE INVENTION

In accordance with the present invention, an item processing system and method which track label usage is provided.

The item processing system includes a barcode reader, a radio frequency label interrogator, and a computer which obtains first identification information from the barcode reader and second identification information from the radio frequency label interrogator, which associates receipt of the first identification information with an item if the item includes a barcode label, and which associates receipt of the second identification information with the item if the item includes a radio frequency label.

It is accordingly an object of the present invention to provide an item processing system and method which track label usage.

It is another object of the present invention to provide a system and method of collecting data on the usage of barcode labels and RFID labels by manufacturers.

It is another object of the present invention to provide a system and method of RFID usage data using an item checkout apparatus which reads both barcode labels and RFID labels.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 2 is a flow diagram illustrating the operation of the checkout apparatus.

DETAILED DESCRIPTION

Figure 1:
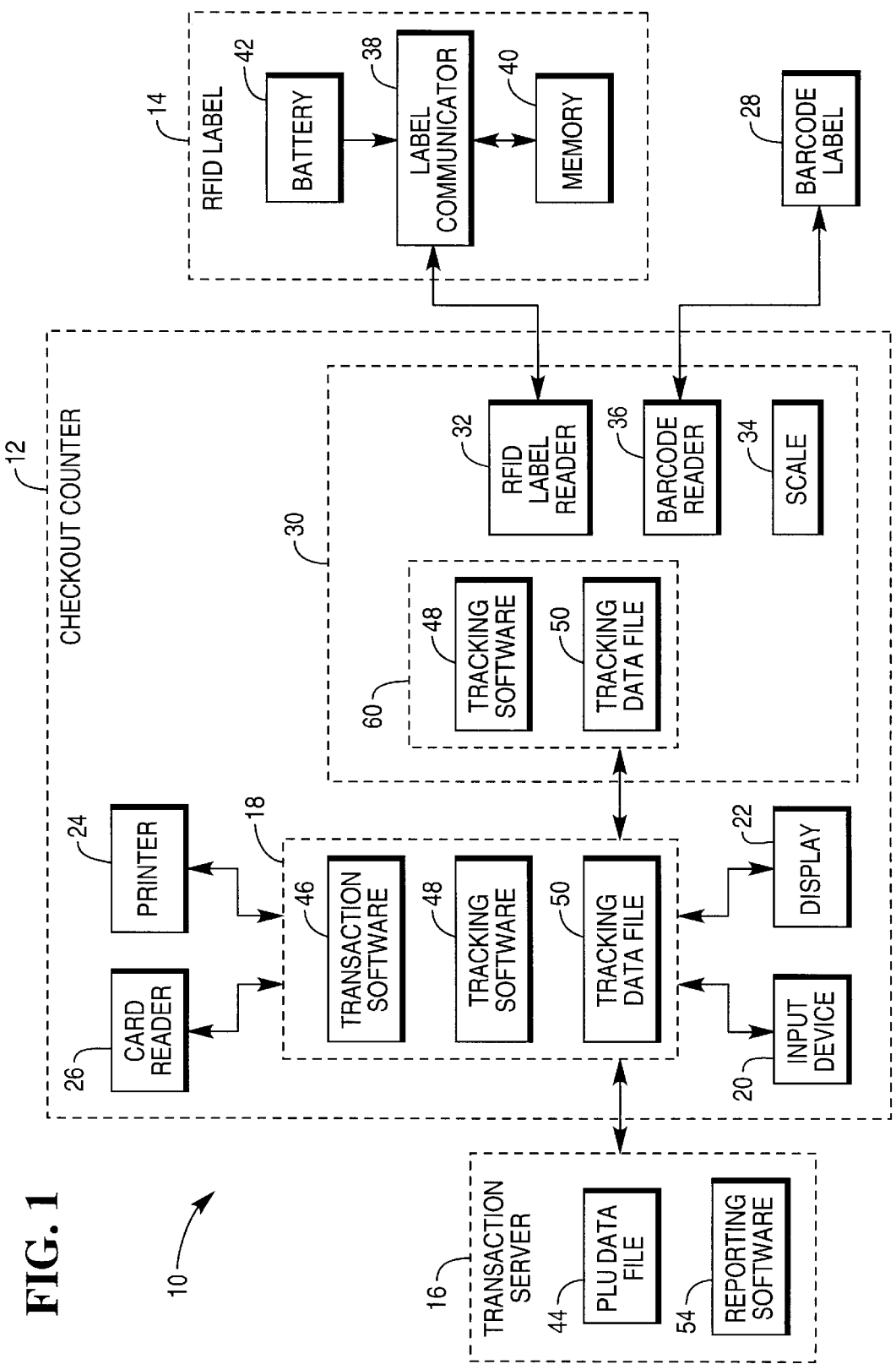
FIG. 1 is a block diagram of a transaction system with RFID capability.

Referring to FIG. 1, transaction system 10 primarily includes checkout counter 12 and transaction server 16.

Checkout counter 12 includes terminal 18, input device 20, display 22, printer 24, card reader 26, RFID label reader 32, and barcode reader 36.

Terminal 18 controls operation of checkout counter 12 and executes transaction software 46. Terminal 18 obtains item identification information from item checkout apparatus 30 and price information from transaction server 16.

Input device 20 records operator selections. Input device 20 may be a touch screen or keyboard.

Display 22 displays program instructions to assist the operator through a transaction. Display 22 may be a liquid crystal display and may be combined with input device 20 as a touch screen.

Printer 24 prints transaction information on receipt paper.

Card reader 26 reads information from customer payment and identification cards. Card reader 26 may include a magnetic stripe reader or smart card reader or combination of both.

RFID label reader 32 reads item identification information stored in RFID label 14.

Barcode reader 36 reads barcode label 28.

Scale 34 provides weight information for produce items and other random weight or bulk items. Scale 34 may be combined with barcode reader 36.

In one embodiment, RFIDS label reader 32 and barcode reader 36 are separate devices, individually used by an operator. In this embodiment, terminal 18 executes tracking software 48, which records item identification numbers of items labelled with RFID labels 14 and item identification numbers of items labelled with barcodes 28. Tracking software 48 maintains tracking data file 50.

In another embodiment, RFIDS label reader 32 and barcode reader 36 are integrated into an item checkout apparatus 30. Item checkout apparatus 30 includes control circuitry 60.

Control circuitry 60 controls operation of item checkout apparatus 30. Control circuitry 60 obtains item identification information from RFID label 14 and barcode label 28. Control circuitry 60 may decode barcode label 28 if barcode reader 36 does not include its own decoding circuitry. Control circuitry 60 additionally executes tracking software 48.

RFID label 14 is an identification label. RFID label 14 may vary in size, depending upon product size, and may be visible or hidden when attached to a product. RFID label 14 may be removably or permanently attached to the product.

In one embodiment, RFID label 14 includes label communicator 38, RFID memory, and battery 42. Label communicator 38 sends item identification information stored in RFID memory 40 to label reader 32. Label communicator 38 may include an RF transceiver.

Memory 40 stores item identification information and may include a read-only memory (ROM) for one-time use, or a programmable ROM (EPROM) for repeated use.

Battery 42 provides power to label communicator 38.

In another embodiment, RFID label 14 may be a passive label. Passive RFID labels use very little energy and may only include label communicator 38. Power may be derived from radio waves.

Label communicator 38 may include a reflective antenna which has a frequency which is unique among RFID labels 14. Label communicator 38 communicates RFID label identification information which must be cross-referenced to obtain item identification information from a table. Label communicator 38 may include a number of antennas, such as conductive ink antennas.

Transaction server 16 receives item identification information from terminal 18 and returns price information from price look-up data file 44.

Transaction server 16 additionally executes reporting software 54, which obtains tracking data from tracking data files 50 and corresponding manufacturer information from PLU data file 44, or another filed cross-referenced item identification information, and generates reports identifying manufacturers and the types of labelling they use.

With this information, retailers and equipment manufacturers may approach product manufacturers with concerns about labelling practices. Retailers may reduce labor costs by managing time spent by workers reading barcode labels 28 versus time spent by equipment reading RFID labels 14. Retailer insurance costs covering hand and wrist injuries may go down if reading of barcode labels 28 is discouraged in favor of reading RFID labels 14.

Referring now to FIG. 2, the operation of system 10 is illustrated in detail beginning with START 60.

In step 62, tracking software 48 waits for barcode information from barcode reader 36 and RFID label information from RFID reader 32.

In step 64, tracking software 48 logs item identification information derived by barcode reader 36 and derived from RFID label information from RFID reader 32 in tracking data file 50.

In step 66, reporting software 54 obtains the tracking information, including the item identification information, from tracking data file 50.

In step 68, reporting software 54 obtains the manufacturer information from PLU data file 44.

In step 70, reporting software 54 provides a report identifying manufacturers and the types of labelling they use on items they sell.

Operation returns to step 62 to await another signal.

Although the present invention has been described with particular reference to certain preferred embodiments thereof, variations and modifications of the present invention can be effected within the spirit and scope of the following claims.

I claim:

1. An item processing method comprising the steps of:
   activating a barcode reader to obtain first identification information from an item;
   activating a radio frequency label interrogator to obtain second identification information from the item;
   if the item has a barcode label, obtaining the first identification information by the barcode reader, logging the item with the first identification information as having the barcode label, obtaining manufacturer information associated with the item with the first identification information to identity a manufacturer who used the barcode label, and generating a report listing the manufacturer who used the barcode label for contacting the manufacturer to persuade the manufacturer to use a radio frequency label instead of the barcode label.

2. An item processing method comprising the steps of:
   activating a barcode reader to obtain first identification information from an item and a radio frequency label interrogator to obtain second identification information from the item;
   if the item has a barcode label, obtaining the first identification information by the barcode reader, logging the item with the first identification information as having the barcode label, obtaining first manufacturer information associated with the item with the first identification information to identify a first manufacturer who used the barcode label, and generating a report listing the first manufacturer who used the barcode label to persuade the manufacturer to use a radio frequency label instead of the barcode label; and
   if the item has a the radio frequency product label, obtaining the second identification information by the radio frequency label interrogator, logging the item with the second identification information as having the radio frequency label, obtaining second manufacturer information associated with the item with the second identification information to identify a second manufacturer who used the radio frequency label, and generating a report listing the second manufacturer Who used the radio frequency label to persuade the manufacturer to continue using the radio frequency label instead of the barcode label.

3. An item processing system comprising:
   a barcode reader;
   a radio frequency label interrogator coupled to the barcode reader; and
   a computer
      for activating the barcode reader to obtain first identification information from an item, for activating a radio frequency label interrogator to obtain second identification information from the item, and
      if the item has a barcode label, for obtaining the first identification information from the barcode reader, logging the item with the first identification information as having the barcode label, obtaining manufacturer information associated with the item with the first identification information to identify a manufacturer who used the barcode label, and generating a report listing the manufacturer who used the barcode label for contacting the manufacturer to persuade the manufacturer to use a radio frequency label instead of the barcode label.

4. An item processing system comprising:
   a barcode reader;
   a radio frequency label interrogator coupled to the barcode reader; and
   a computer
      for activating the barcode reader to obtain first identification information from an item, for activating a radio frequency label interrogator to obtain second identification information from the item,
      if the item has a barcode label, for obtaining the first identification information from the barcode reader, logging the item with the first identification information as having the barcode label, obtaining manufacturer information associated with the item with the first identification information to identify a manufacturer who used the barcode label, and generating a report listing the manufacturer who used the barcode label for contacting the manufacturer to persuade the manufacturer to use a radio frequency label instead of the barcode label, and
      if the item has the radio frequency product label, for obtaining the second identification information by the radio frequency label interrogator, for logging the item with the second identification information as having the radio frequency label, for obtaining second manufacturer information associated with the item with the second identification information to identify a second manufacturer who used the radio frequency label, and for generating a report listing the second manufacturer who used the radio frequency label to persuade the manufacturer to continue using the radio frequency label instead of the barcode label.

* * * * *

UNITED STATES PATENT AND TRADEMARK OFFICE
CERTIFICATE OF CORRECTION

PATENT NO. : 6,592,038 B2
DATED : July 15, 2003
INVENTOR(S) : Goodwin, J. C. III It is certified that error appears in the above-identified patent and that said Letters Patent is hereby corrected as shown below:

Column 4,
Line 13, after "has" delete "a".

Signed and Sealed this

Tenth Day of February, 2004

JON W. DUDAS
*Acting Director of the United States Patent and Trademark Office*